United States Patent
Shamarao et al.

(10) Patent No.: US 9,836,173 B2
(45) Date of Patent: Dec. 5, 2017

(54) OPTIMIZING PIXEL SETTLING IN AN INTEGRATED DISPLAY AND CAPACITIVE SENSING DEVICE

(71) Applicant: SYNAPTICS INCORPORATED, San Jose, CA (US)

(72) Inventors: Prashant Shamarao, Cupertino, CA (US); Joseph Kurth Reynolds, San Jose, CA (US); Stephen L. Morein, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 65 days.

(21) Appl. No.: 15/085,316

(22) Filed: Mar. 30, 2016

(65) Prior Publication Data

US 2017/0285793 A1    Oct. 5, 2017

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
None
See application file for complete search history.

(56) References Cited

U.S. PATENT DOCUMENTS

| | | | |
|---|---|---|---|
| 7,679,586 B2 | 3/2010 | Stewart | |
| 8,358,299 B2 | 1/2013 | Chaji et al. | |
| 8,493,051 B2 | 7/2013 | Ivanov et al. | |
| 8,643,624 B2 | 2/2014 | Day et al. | |
| 8,810,495 B2 | 8/2014 | Teranishi | |
| 9,007,336 B2 | 4/2015 | Shepelev et al. | |
| 9,024,913 B1 | 5/2015 | Jung et al. | |
| 9,164,641 B1* | 10/2015 | Rowe | G06F 3/044 |
| 2008/0309627 A1* | 12/2008 | Hotelling | G02F 1/134363 345/173 |
| 2009/0009498 A1 | 1/2009 | Nishimura | |
| 2010/0253638 A1* | 10/2010 | Yousefpor | G06F 3/0412 345/173 |
| 2011/0134154 A1 | 6/2011 | Miyachi et al. | |
| 2011/0187677 A1* | 8/2011 | Hotelling | G06F 3/0412 345/174 |
| 2011/0210939 A1* | 9/2011 | Reynolds | G06F 3/0418 345/174 |
| 2011/0210941 A1 | 9/2011 | Reynolds et al. | |

(Continued)

*Primary Examiner* — Joseph Haley
*Assistant Examiner* — Karin Kiyabu
(74) *Attorney, Agent, or Firm* — Patterson + Sheridan, LLP

(57) ABSTRACT

An example method of performing capacitive sensing and display updating in an integrated capacitive sensing device and display device includes driving a plurality of sensor electrodes of the capacitive sensing device for input sensing during a blanking period. The method further includes driving a plurality of source lines using a plurality of source drivers during the blanking period to update a first display line of the display device. The method further includes driving the plurality of source lines using the plurality of source drivers during a display update period to update one or more additional display lines of the display device. The method further includes adjusting an operational mode of the plurality of source drivers during the blanking period to equalize display pixel settling between the blanking period and the display update period.

20 Claims, 6 Drawing Sheets

(56) References Cited

U.S. PATENT DOCUMENTS

| | | | |
|---|---|---|---|
| 2012/0113047 A1 | 5/2012 | Hanauer et al. | |
| 2012/0229419 A1* | 9/2012 | Schwartz | G06F 3/0418 345/174 |
| 2012/0249476 A1 | 10/2012 | Schwartz et al. | |
| 2013/0057481 A1* | 3/2013 | Lee | G06F 3/0412 345/173 |
| 2013/0057511 A1* | 3/2013 | Shepelev | G06F 3/044 345/174 |
| 2013/0300681 A1* | 11/2013 | Jamshidi-Roudbari | G06F 3/0412 345/173 |
| 2013/0335338 A1* | 12/2013 | Lai | G06F 3/044 345/173 |
| 2014/0049507 A1* | 2/2014 | Shepelev | G06F 3/0412 345/174 |
| 2014/0049509 A1* | 2/2014 | Shepelev | G06F 3/044 345/174 |
| 2014/0232664 A1* | 8/2014 | Henry | G06F 3/0412 345/173 |
| 2014/0267349 A1* | 9/2014 | Lee | G06F 3/044 345/589 |
| 2015/0049044 A1* | 2/2015 | Yousefpor | G06F 3/044 345/174 |
| 2015/0091850 A1* | 4/2015 | Morein | G06F 3/0412 345/174 |
| 2015/0193041 A1* | 7/2015 | Shepelev | G06F 3/044 345/174 |
| 2015/0261356 A1* | 9/2015 | Shepelev | G06F 3/044 345/174 |
| 2015/0277650 A1* | 10/2015 | Small | G06F 3/0416 345/174 |
| 2016/0202819 A1* | 7/2016 | Chen | G06F 3/0412 345/174 |
| 2016/0328079 A1* | 11/2016 | Schwartz | G06F 3/0416 |
| 2016/0334923 A1* | 11/2016 | Chan | G09G 3/3677 |
| 2017/0115779 A1* | 4/2017 | Shepelev | G06F 3/044 |
| 2017/0192581 A1* | 7/2017 | Shamarao | G06F 3/0416 |

\* cited by examiner

OPTIMIZING PIXEL SETTLING IN AN INTEGRATED DISPLAY AND CAPACITIVE SENSING DEVICE

BACKGROUND

Field of the Disclosure

Embodiments of disclosure generally relate to integrated display and capacitive sensing devices and, more particularly, optimizing pixel settling to minimize display artifacts.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Techniques for optimizing pixel settling in an integrated display and capacitive sensing device are described. In an embodiment, a method of performing capacitive sensing and display updating in an integrated capacitive sensing device and display device includes driving a plurality of sensor electrodes of the capacitive sensing device for input sensing during a blanking period. The method further includes driving a plurality of source lines using a plurality of source drivers during the blanking period to update a first display line of the display device. The method further includes driving the plurality of source lines using the plurality of source drivers during a display update period to update one or more additional display lines of the display device. The method further includes adjusting an operational mode of the plurality of source drivers during the blanking period to equalize display pixel settling between the blanking period and the display update period.

In another embodiment, processing system for a capacitive sensing device and a display device includes sensing circuitry configured to drive a plurality of sensor electrodes of the capacitive sensing device for input sensing during a blanking period. The processing system further includes a plurality of source drivers configured to drive a plurality of source lines to update a first display line of the display device during the blanking period and to update one or more additional display lines of the display device during a display update period. The processing system further includes a controller, coupled to the plurality of source drivers, configured to adjust an operational mode of the plurality of source drivers during the blanking period to equalize display pixel settling between the blanking period and the display update period.

In another embodiment, an input device comprising a capacitive sensing device and a display device includes a plurality of sensor electrodes, a plurality of source lines, and a processing system, coupled to the plurality of sensor electrodes and the plurality of source lines. The processing system includes sensing circuitry configured to drive the plurality of sensor electrodes for input sensing during a blanking period. The processing system further includes a plurality of source drivers configured to drive the plurality of source lines to update a first display line of the display device during the blanking period and to update one or more additional display lines of the display device during a display update period. The processing system further includes a controller, coupled to the plurality of source drivers, configured to adjust an operational mode of the plurality of source drivers during the blanking period to equalize display pixel settling between the blanking period and the display update period.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
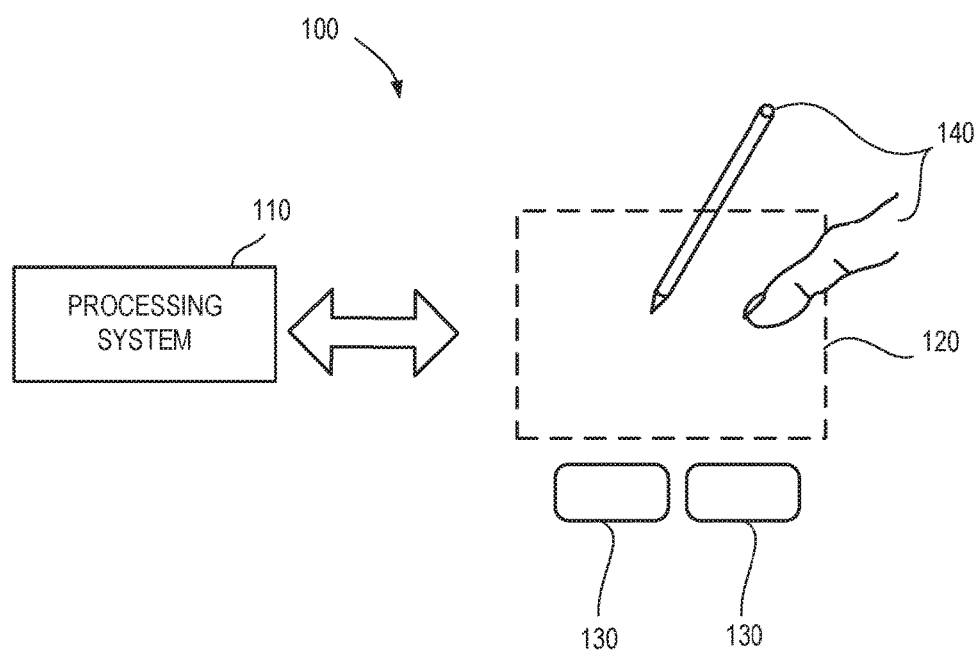
FIG. 1 is a block diagram of an exemplary input device, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastic, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
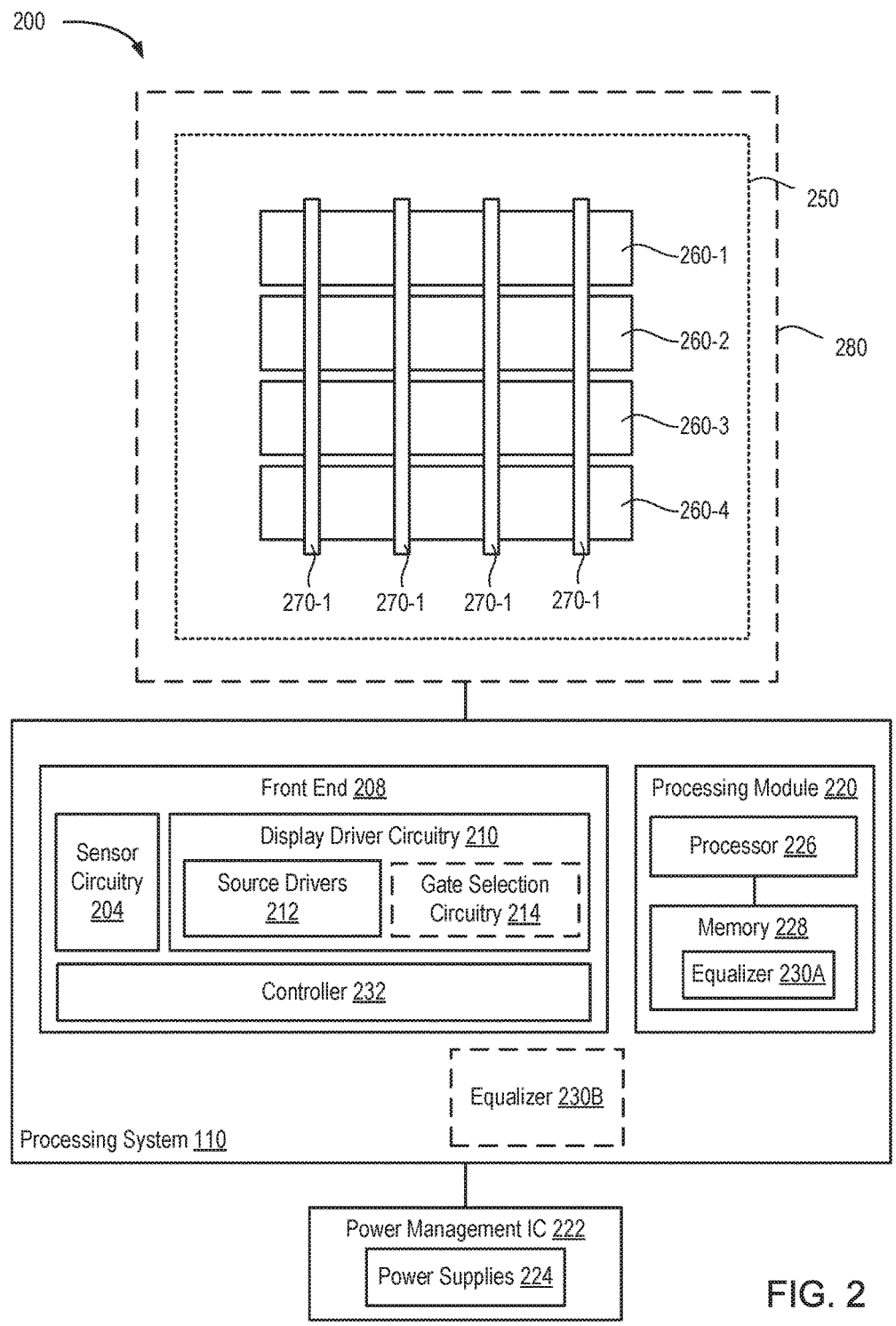
FIG. 2 is block diagram depicting a capacitive sensing device of the input device of FIG. 1 according to some embodiments.

FIG. 2 is a block diagram depicting a capacitive sensing device 200 of the input device 100 according to some embodiments. For clarity of illustration and description, FIG. 2 shows the sensing elements of the capacitive sensing device 200 in a pattern of simple rectangles and does not show various components, such as various interconnects between the sensing elements and the processing system 110. An electrode pattern 250 comprises a first plurality of sensor electrodes 260 (260-1, 260-2, 260-3, . . . 260-$n$), and a second plurality of sensor electrodes 270 (270-1, 270-2, 270-3, . . . 270-$m$) disposed over the first plurality of electrodes 260. In the example shown, n=m=4, but in general n and m are each positive integers and not necessarily equal to each other. In various embodiments, the first plurality of sensor electrodes 260 are operated as a plurality of transmitter electrodes (referred to specifically as "transmitter electrodes 260"), and the second plurality of sensor electrodes 270 are operated as a plurality of receiver electrodes (referred to specifically as "receiver electrodes 270"). In another embodiment, one plurality of sensor electrodes may be configured to transmit and receive and the other plurality of sensor electrodes may also be configured to transmit and receive. Further processing system 110 can receive resulting signals with one or more sensor electrodes of the first and/or second plurality of sensor electrodes while the one or more sensor electrodes are modulated with absolute capacitive sensing signals. The first plurality of sensor electrodes 260, the second plurality of sensor electrodes 270, or both can be disposed within the sensing region 120. The electrode pattern 250 is coupled to the processing system 110 through routing traces (discussed below).

The first plurality of electrodes 260 and the second plurality of electrodes 270 are typically ohmically isolated from each other. That is, one or more insulators separate the first plurality of electrodes 260 and the second plurality of electrodes 270 and prevent them from electrically shorting to each other. In some embodiments, the first plurality of electrodes 260 and the second plurality of electrodes 270 are separated by insulative material disposed between them at cross-over areas; in such constructions, the first plurality of electrodes 260 and/or the second plurality of electrodes 270 can be formed with jumpers connecting different portions of the same electrode. In some embodiments, the first plurality of electrodes 260 and the second plurality of electrodes 270 are separated by one or more layers of insulative material. In such embodiments, the first plurality of electrodes 260 and the second plurality of electrodes 270 can be disposed on separate layers of a common substrate. In some other embodiments, the first plurality of electrodes 260 and the second plurality of electrodes 270 are separated by one or more substrates; for example, the first plurality of electrodes 260 and the second plurality of electrodes 270 can be disposed on opposite sides of the same substrate, or on different substrates that are laminated together. In some embodiments, the first plurality of electrodes 260 and the second plurality of electrodes 270 can be disposed on the same side of a single substrate.

The areas of localized capacitive coupling between the first plurality of sensor electrodes 260 and the second plurality sensor electrodes 270 may be form "capacitive pixels" of a "capacitive image." The capacitive coupling between sensor electrodes of the first and second pluralities 260 and 270 changes with the proximity and motion of input objects in the sensing region 120. Further, in various embodiments, the localized capacitive coupling between each of the first plurality of sensor electrodes 260 and the second plurality of sensor electrodes 270 and an input object may be termed "capacitive pixels" of a "capacitive image." In some embodiments, the localized capacitive coupling between each of the first plurality of sensor electrodes 260 and the second plurality of sensor electrodes 270 and an input object may be termed "capacitive measurements" of "capacitive profiles."

The processing system 110 can include a front end 208 having sensor circuitry 204. The sensor circuitry 204 operates the electrode pattern 250 to receive resulting signals from sensor electrodes using a capacitive sensing signal having a sensing frequency. The processing system 110 can include a processing module 220 configured to determine capacitive measurements from the resulting signals. The processing module 220 can include processor circuitry 226, such as a digital signal processor (DSP), microprocessor, or the like. The processing module 220 can include memory 228 configured to store software and/or firmware configured for execution by processor circuitry 226 to implement various functions, such as determining object position from the resulting signals. Alternatively, some or all of the functions of the processor module 220 can be implemented entirely in hardware (e.g., using integrated circuitry). The processing module 220 can track changes in capacitive measurements to detect input object(s) in the sensing region 120. The processing system 110 can include other modular configurations, and the functions performed by the front end 208 and the processing module 220 can, in general, be performed by one or more modules or circuits in the processing system 110. The processing system 110 can include other modules and circuits, and can perform other functions as described in some embodiments below.

The processing system 110 can operate in absolute capacitive sensing mode or transcapacitive sensing mode. In absolute capacitive sensing mode, receiver(s) in the sensor circuitry 204 measure voltage, current, or charge on sensor electrode(s) in the electrode pattern 250 while the sensor electrode(s) are modulated with absolute capacitive sensing signals to generate the resulting signals. The processing module 220 generates absolute capacitive measurements from the resulting signals. The processing module 220 can track changes in absolute capacitive measurements to detect input object(s) in the sensing region 120.

In transcapacitive sensing mode, transmitter(s) in the sensor circuitry 204 drive one or more of the first plurality of electrodes 260 with the capacitive sensing signal (also referred to as a transmitter signal or modulated signal in the transcapacitive sensing mode). Receiver(s) in the sensor circuitry 204 measure voltage, current, or charge on one or more of the second plurality of electrodes 270 to generate the resulting signals. The resulting signals comprise the effects of the capacitive sensing signal and input object(s) in the sensing region 120. The processing module 220 generates transcapacitive measurements from the resulting signals. The processing module 220 can track changes in transcapacitive measurements to detect input object(s) in the sensing region 120.

In some embodiments, the processing system 110 "scans" the electrode pattern 250 to determine capacitive measurements. In the transcapacitive sensing mode, the processing system 110 can drive the first plurality of electrodes 260 to transmit transmitter signal(s). The processing system 110 can operate the first plurality of electrodes 260 such that one transmitter electrode transmits at one time, or multiple transmitter electrodes transmit at the same time. Where multiple transmitter electrodes transmit simultaneously, these multiple transmitter electrodes may transmit the same transmitter signal and effectively produce a larger transmitter electrode, or these multiple transmitter electrodes may transmit different transmitter signals. For example, multiple transmitter electrodes may transmit different transmitter signals according to one or more coding schemes that enable their combined effects on the resulting signals of the second plurality of electrodes 270 to be independently determined. In the absolute capacitive sensing mode, the processing system 110 can receiving resulting signals from one sensor electrode 260, 270 at a time, or from a plurality of sensor electrodes 260, 270 at a time. In either mode, the processing system 110 can operate the second plurality of electrodes 270 singly or collectively to acquire resulting signals. In absolute capacitive sensing mode, the processing system 110 can concurrently drive all electrodes along one or more axes. In some examples, the processing system 110 can drive electrodes along one axis (e.g., along the first plurality of sensor electrodes 260) while electrodes along another axis are driven with a shield signal, guard signal, or the like. In some examples, some electrodes along one axis and some electrodes along the other axis can be driven concurrently.

In the transcapacitive sensing mode, the processing system 110 can use the resulting signals to determine capacitive measurements at the capacitive pixels. A set of measurements from the capacitive pixels form a "capacitive image" (also "capacitive frame") representative of the capacitive measurements at the pixels. The processing system 110 can acquire multiple capacitive images over multiple time periods, and can determine differences between capacitive images to derive information about input in the sensing region 120. For example, the processing system 110 can use successive capacitive images acquired over successive periods of time to track the motion(s) of one or more input objects entering, exiting, and within the sensing region 120.

In absolute capacitive sensing mode, the processing system 110 can use the resulting signals to determine capacitive measurements along an axis of the sensor electrodes 260 and/or an axis of the sensor electrodes 270. A set of such measurements forms a "capacitive profile" representative of the capacitive measurements along the axis. The processing system 110 can acquire multiple capacitive profiles along one or both of the axes over multiple time periods and can determine differences between capacitive profiles to derive information about input in the sensing region 120. For example, the processing system 110 can use successive capacitive profiles acquired over successive periods of time to track location or proximity of input objects within the sensing region 120. In other embodiments, each sensor can be a capacitive pixel of a capacitive image and the absolute capacitive sensing mode can be used to generate capacitive image(s) in addition to or in place of capacitive profiles.

The baseline capacitance of the input device 100 is the capacitive image or capacitive profile associated with no input object in the sensing region 120. The baseline capacitance changes with the environment and operating conditions, and the processing system 110 can estimate the baseline capacitance in various ways. For example, in some embodiments, the processing system 110 takes "baseline images" or "baseline profiles" when no input object is determined to be in the sensing region 120, and uses those baseline images or baseline profiles as estimates of baseline capacitances. The processing module 220 can account for the baseline capacitance in the capacitive measurements and thus the capacitive measurements can be referred to as "delta capacitive measurements". Thus, the term "capacitive measurements" as used herein encompasses delta-measurements with respect to a determined baseline.

In some touch screen embodiments, at least one of the first plurality of sensor electrodes 260 and the second plurality of sensor electrodes 270 comprise one or more display electrodes of a display device 280 used in updating a display of a display screen, such as one or more segments of a "Vcom" electrode (common electrodes), gate electrodes, source electrodes, anode electrode and/or cathode electrode. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. The display electrodes can also be referred to as "common electrodes," since the display electrodes perform functions of display updating and capacitive sensing. In various embodiments, each sensor electrode of the first and/or second plurality of sensor electrodes 260 and 270 comprises one or more common electrodes. In other embodiments, at least two sensor electrodes of the first plurality of sensor electrodes 260 or at least two sensor electrodes of the second plurality of sensor electrodes 270 may share at least one common electrode. Furthermore, in one embodiment, both the first plurality of sensor electrodes 260 and the second plurality electrodes 270 are disposed within a display stack on the display screen substrate. An example display stack is described below with respect to FIG. 3. Additionally, at least one of the sensor electrodes 260, 270 in the display stack may comprise a common electrode. However, in other embodiments, only the first plurality of sensor electrodes 260 or the second plurality of sensor electrodes 270 (but not both) are disposed within the display stack, while other sensor electrodes are outside of the display stack (e.g., disposed on an opposite side of a color filter glass).

In an embodiment, the processing system 110 comprises a single integrated controller, such as an application specific integrated circuit (ASIC), having the front end 208, the processing module 220, and any other module(s) and/or circuit(s). In another embodiment, the processing system 110 can include a plurality of integrated circuits, where the front end 208, the processing module 220, and any other module(s) and/or circuit(s) can be divided among the integrated circuits. For example, the front end 208 can be on one integrated circuit, and the processing module 220 and any other module(s) and/circuit(s) can be one or more other integrated circuits. In some embodiments, a first portion of the front end 208 can be on one integrated circuit and a second portion of the front end 208 can be on second integrated circuit. In such embodiments, at least one of the first and second integrated circuits comprises at least portions of other modules, such as a display driver module and/or a display driver module.

The processing system 110 is coupled to a power management IC 222. The power management IC 222 includes one or more power supplies 224. Each of the power supplies 224 provides a particular voltage for use by the processing system 110. For example, the power supplies 224 can output one or more display voltages for use by the display driver circuitry 210 (discussed below). The power supplies can output one or more sensing voltages for use by the sensor circuitry 204. The power supplies 224 can generate the supply voltages from an input power source (e.g., a battery) (not shown). For example, the power supplies 224 can include one or more DC-to-DC converters for outputting the various supply voltages of different DC voltage levels given one or more input DC voltages.

Figures 3, 5:
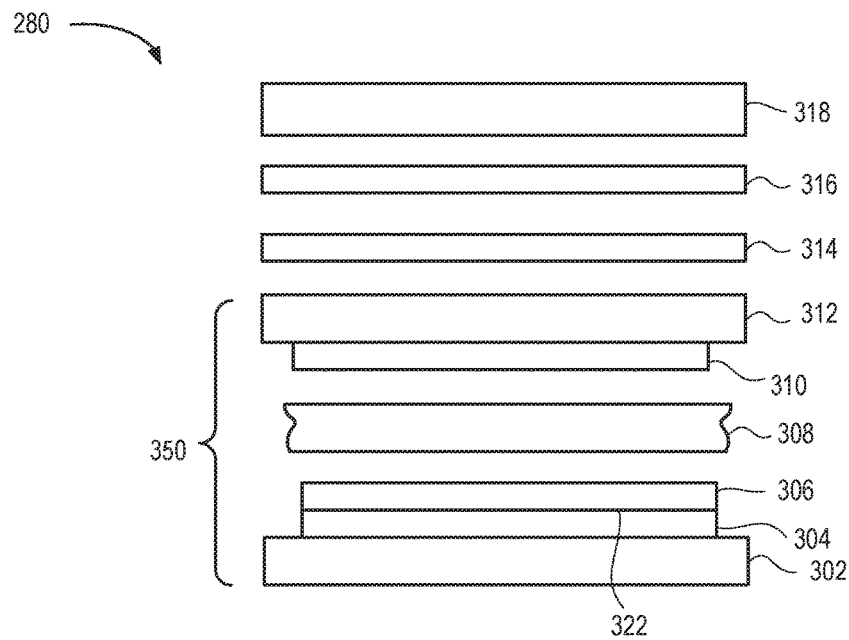
FIG. 3 is an exploded view of a display device according to an embodiment.
FIG. 5 is a block diagram depicting timing of display updating and capacitive sensing according to an embodiment.

FIG. 3 is an exploded view of the display device 280 according to an embodiment. The capacitive sensing device 200 is integrated with the display device 280. The display device 280 generally includes a plurality of transparent substrates positioned over a first substrate, referred to herein as thin-film transistor (TFT) glass 302. An active element 304 is formed on the TFT glass 302. The active element 304 includes TFT layers 322 that form display update circuitry configured to update a plurality of pixels. The TFT layers 322 of the active element 304 can be electrically coupled to display electrodes, including pixel electrodes 322 and Vcom electrodes 306. In an embodiment, the Vcom electrodes 306 are disposed on the TFT glass 302. In the embodiment shown, the Vcom electrodes 306 are disposed on the top TFT layers 322 of the active element 304. In some embodiments, the Vcom electrodes 306 are segmented into a plurality of common electrodes and used for both display updating and capacitive sensing. The Vcom electrodes 306 can also include electrodes that are used only for display updating. In other embodiments, the Vcom electrodes 306 can be located in a different layer, such as under the color filter glass 312 (described below).

The display device 280 includes a second substrate, referred to herein as color filter glass 312, a lens 318, an optional polarizer 316, and an optional anti-shatter film 314. A layer of display material 308 (e.g., liquid crystal) is disposed between the color filter glass 312 and the TFT glass 302. In an embodiment, layer(s) 310 between the color filter glass 312 and the display material 308 include one or more color filters and a black mask. A region between and including the color filter glass 312 and the TFT glass 302 is referred to herein as display stack 350.

In one embodiment, sensing elements of the capacitive sensing device 200 are disposed at least partially within the display stack 350. Sensing elements, such as receiver electrodes 270, can be disposed between the color filter glass 312 and the display material 322 (e.g., within layer(s) 310). Sensing elements, such as transmitter electrodes 260, can be common electrodes of the Vcom electrodes 306. In other embodiments, receiver electrodes 270 can be disposed outside of the display stack 280, such as on the color filter glass 312 outside of the display stack 280.

Figure 4:
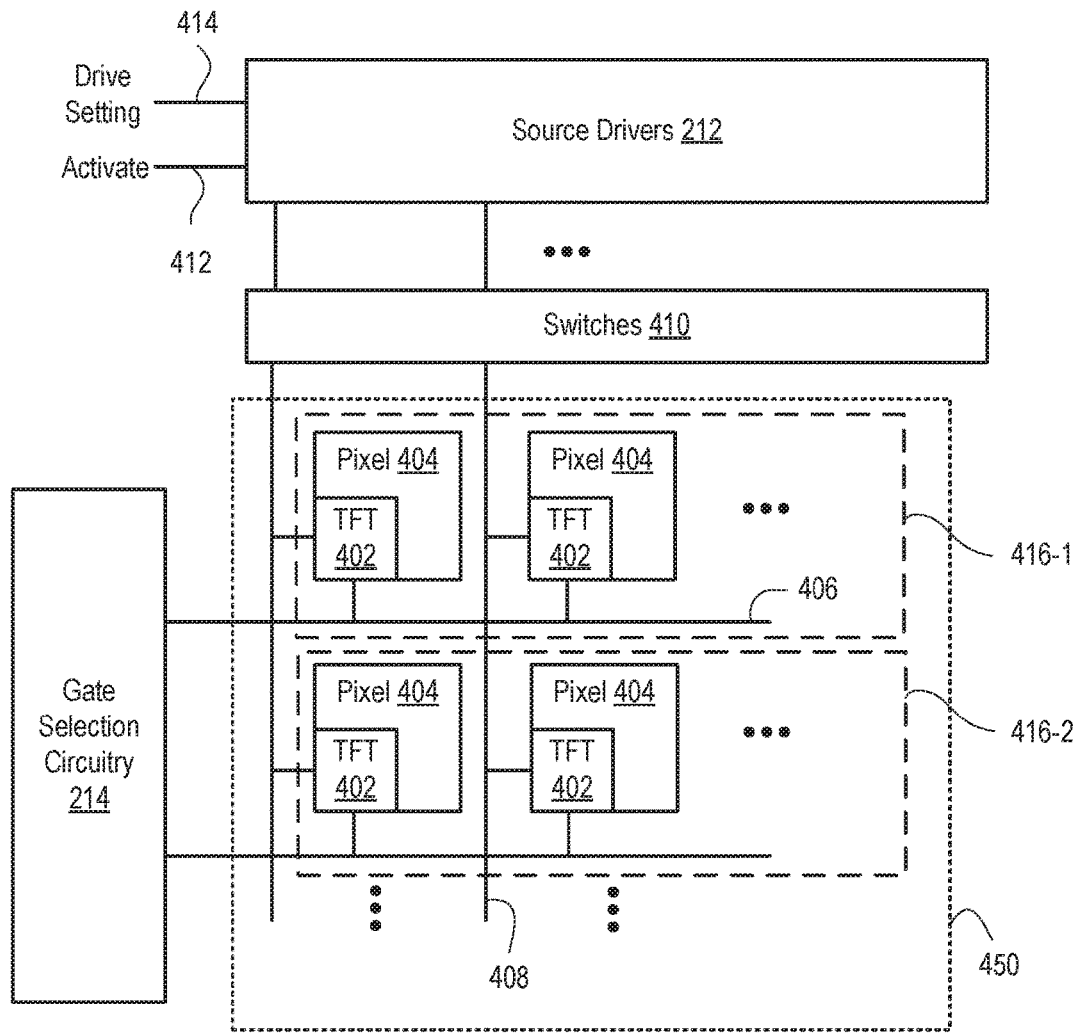
FIG. 4 is a block diagram depicting display circuitry of the display device of FIG. 3 according to an embodiment.

FIG. 4 is a block diagram depicting display circuitry 450 of the display device 280 according to an embodiment. The display circuitry 450 can be formed in the active element 304 of the display stack 350. The display circuitry 450 is coupled to source drivers 212 through switches 410. The display circuitry 450 is also coupled to gate selection circuitry 214. For purposes of clarity, the display electrodes are omitted from FIG. 4.

The source drivers 212 are coupled to source lines 408 of the display circuitry 450 through the switches 410. The switches 410 selectively couple individual source drivers 212 to the source lines 408. The gate selection circuitry 214 is coupled to gate lines 406 of the display circuitry 450. The display circuitry 450 includes a plurality of pixels 404, each of which is coupled to one or more TFTs 402. A source of each TFT 402 is coupled to a respective source line. A gate of each TFT 402 is coupled to a respective gate line. A drain of each TFT 402 is coupled to a pixel electrode of a respective pixel 404. Each source line 408 drives TFTs in a column of pixels 404. Each gate line 406 drives TFTs in a row of pixels 404. The pixels 404 are used to display an image on a display screen. By coordinating the gate voltages provided by the gate selection circuitry 214 and the source voltages provided by the source drivers 212, the display driver circuitry 210 can set the pixels 404 and display an image on a display screen.

Returning to FIG. 2, in an embodiment, the source drivers 212 are part of display diver circuitry 210 in the front end 208 of the processing system 110. That is, the front end 208 of the processing system 110 can be configured to perform both display updating and capacitive sensing. In an embodiment, the display driver circuitry 210 can also include the gate selection circuitry 214. In other embodiments, the gate selection circuitry 214 can be located external to the processing system 110, such as in another integrated circuit. In an embodiment, the gate selection circuitry 214 is disposed in the display circuitry 450 (e.g., a gate-in-panel (GIP) type of display device).

The front end 208 also includes a controller 232. The controller 232 is configured to alternately control the sensor circuitry 204 to perform capacitive sensing and the display driver circuitry 210 to perform display updating.

FIG. 5 is a block diagram depicting timing of display updating and capacitive sensing according to an embodiment. The controller 232 can control the display driver circuitry 210 to update the display during a display update period 502. The controller 232 can control the sensor circuitry 204 to perform capacitive sensing during an interval 504 referred to herein as a blanking period. In some embodiments, the blanking period is a long horizontal blanking interval (also referred to as the long H-blank interval or long H-blank period). A long H-blank interval comprises a period of time that is longer than a conventional Hblank interval. In an embodiment, the controller 232 can control the display driver circuitry 210 to display one line during each display update period 502. The controller 232 can also implement a vertical blanking interval (not shown) after all lines have been updated. In some embodiments, the blanking periods 504 are shorter in duration than the display update periods 502.

Returning to FIG. 2, a display such as an LCD display is typically designed assuming that all lines are rendered in a contiguous manner between vertical blanking intervals. As discussed above, however, the controller 232 implements a blanking period 504 in order to perform capacitive sensing. The blanking period 504 can result in display artifacts for various reasons. Notably, a long H-blank interval can cause transient variations in supply voltage, transient variations in Vcom voltage level, variation in pixel settling, variation in gate voltage levels, or a combination thereof. Some or all of these effects can lead to display artifacts. In an embodiment, the processing system 110 is configured to mitigate such display artifacts that result from the blanking period 504.

In an embodiment, the processing system 110 includes a power equalizer ("equalizer 230"). In an embodiment, the equalizer 230 is implemented as firmware ("equalizer firmware 230A") executed by the processor 226 in the processing module 220. In another embodiment, the equalizer 230 is implemented as an equalizer circuit 230B. In yet another embodiment, the equalizer 230 is implemented as a combination of the equalizer firmware 230A and the equalizer circuit 230B. In general, the equalizer 230 is configured to adjust an operational mode of the source drivers 212 during the blanking period 504 to equalize display pixel setting between the blanking period 504 and the display update period 502.

Figure 6:
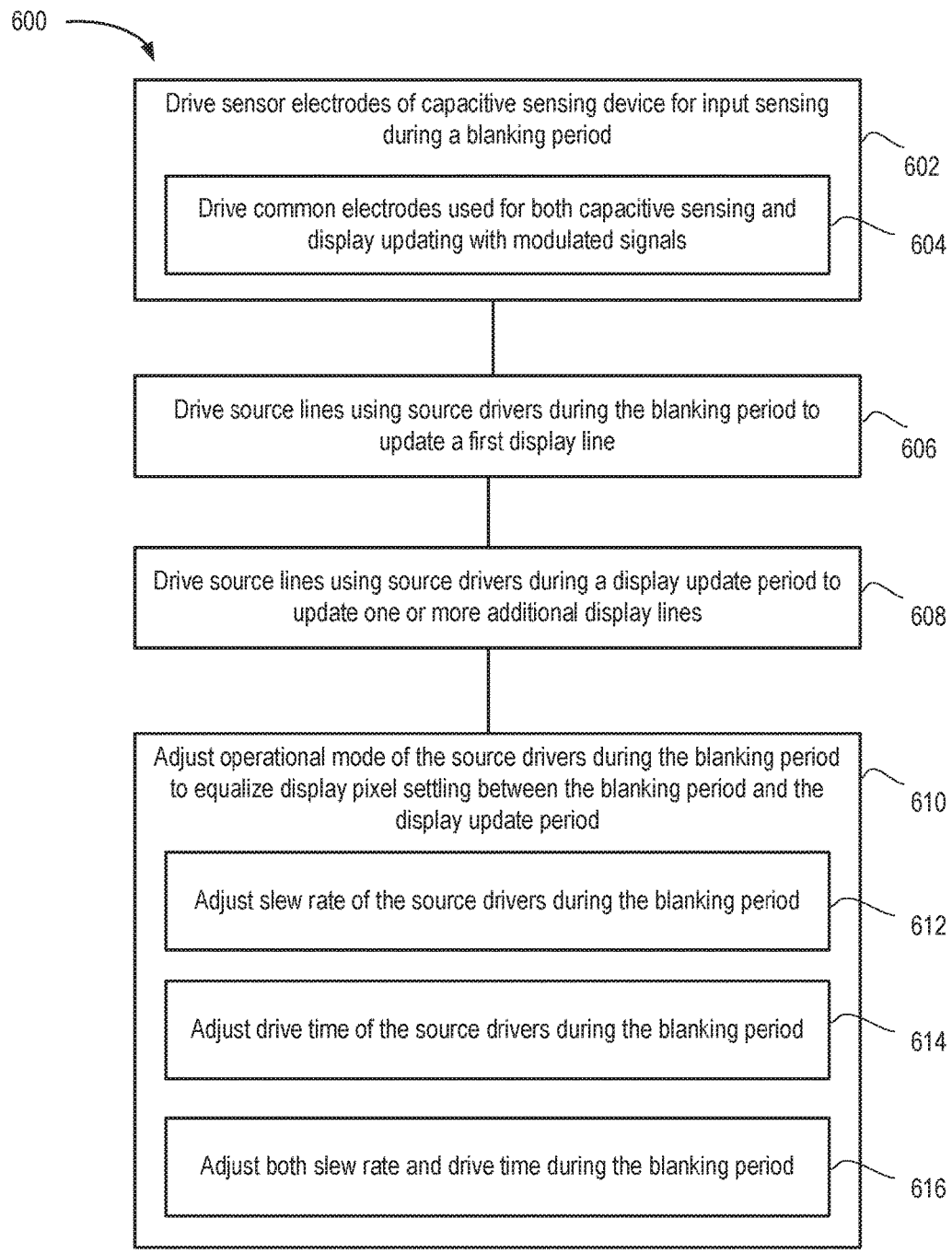
FIG. 6 is a flow diagram depicting a method of capacitive sensing and display updating according to an embodiment.

FIG. 6 is a flow diagram depicting a method 600 of capacitive sensing and display updating according to an embodiment. The method 600 can be performed by the processing system 110. The method 600 begins at step 602, where the sensor circuitry 204 drives the sensor electrodes for input sensing during the blanking period 504. In an embodiment, the sensor circuitry 204 drives common electrodes used for both capacitive sensing and display updating with modulated signals (e.g., for absolute sensing or transcapacitive sensing).

At step 606, the display driver circuitry 210 drives the source lines using the source drivers 212 during the blanking period 504 to update a first display line. For example, in some types of display panels, the rows cannot be fully deactivated when the display is interrupted by blanking period 504 (e.g., gate in display panels). In such displays, it is required to leave some rows activated during the blanking period 504 and the source drivers 212 drive the source lines for display updating. In the present example, one display line is updated during the blanking period 504, but the display driver circuitry 210 can update more than one display line during the blanking period 504.

At step 608, the display driver circuitry 210 drives source lines using the source drivers 212 during the display update period 502 to update one or more additional display lines. At step 610, the equalizer 230 adjusts an operational mode of the source drivers 212 during the blanking period 504 to equalize display pixel settling between the blanking period 504 and the display update period 502.

In an embodiment, step 610 includes a step 612, where the equalizer 230 adjusts the slew rate of the source drivers 212 during the blanking period 504. In another embodiment, step 610 includes a step 614, wherein the equalizer 230 adjusts the drive time of the source drivers 212 during the blanking period 504. In yet another embodiment, step 610 includes a step 616, where the equalizer 230 adjusts both the slew rate and the drive time of the source drivers 212 during the blanking period 504.

Figure 7:
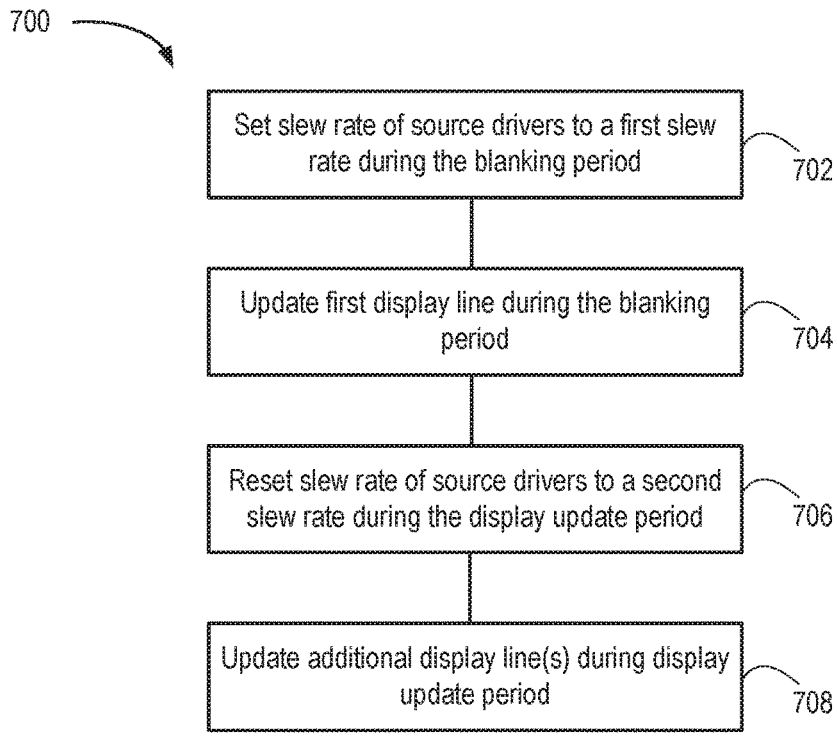
FIG. 7 is a flow diagram depicting a method of adjusting the operational mode of the source drivers to mitigate display artifacts according to an embodiment.

FIG. 7 is a flow diagram depicting a method 700 of adjusting the operational mode of the source drivers to mitigate display artifacts according to an embodiment. At step 702, the equalizer 230 sets the slew rate of the source drivers 212 to a first slew rate during the blanking period 504. At step 704, the display driver circuitry 210 updates the first display line during the blanking period 504. During the blanking period 504, one or more gate lines remain active. For example, in some display panels, it is not possible to inactive all display lines during the blanking period 504 (e.g., multi-phase gate-in-panel (GIP) displays and the like). In general, for such panels, display lines are activated in a staged manner over multiple line times. Thus, during step 704, the display driver circuitry 210 updates the active display lines during the blanking period 504 to ensure that the pixels are updated and display artifacts are minimized. In one embodiment, the signal driving one or more gate lines that remain active during the blanking period 504 remains constant during at least a portion the blanking period 504 in order to reduce interference with capacitive sensing signals. In another embodiment, the signal driving the one or more gate lines during the blanking period 504 may be modulated, also to reduce interference with capacitive sensing signals. At step 706, the equalizer 230 resets the slew rate of the source drivers 212 to a second slew rate during the display update period 502. At step 708, the display driver circuitry 210 updates additional display line(s) during the display update period 502. The first and second slew rates can be set so that the pixel settling levels are equalized between the display update period 502 and the blanking period 504.

Figure 8:
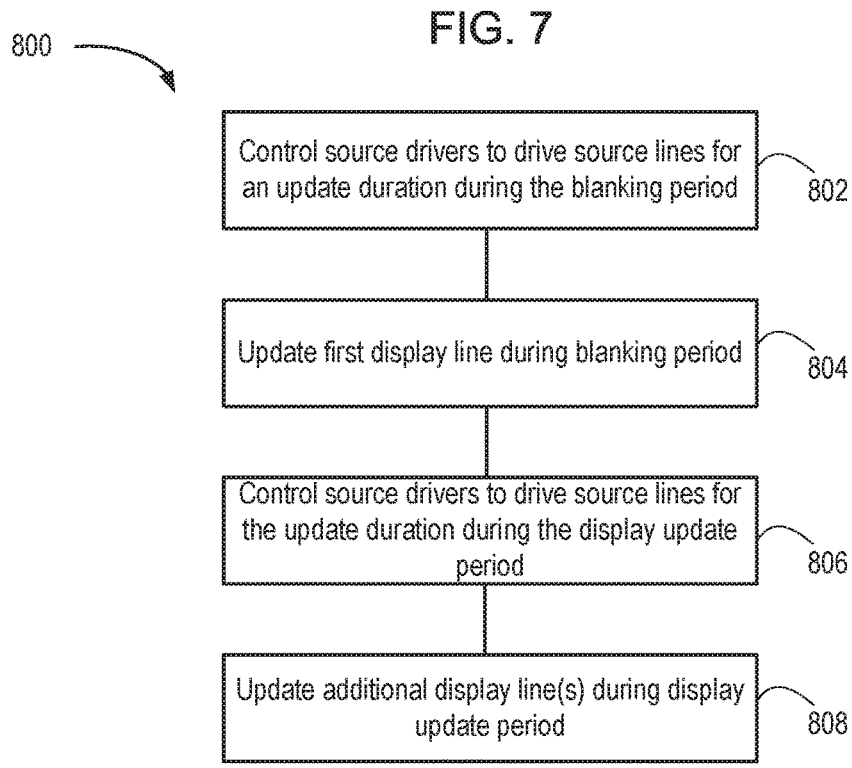
FIG. 8 is a flow diagram depicting a method of adjusting the operational mode of the source drivers to mitigate display artifacts according to another embodiment.

FIG. 8 is a method 800 of adjusting the operational mode of the source drivers to mitigate display artifacts according to an embodiment. At step 802, the equalizer 230 controls the source drivers 212 to drive the source lines for an update duration during the blanking period 504. At step 804, the display driver circuitry 210 updates the first display line during the blanking period 504. As discussed above, during the blanking period 504, one or more gate lines remain active (e.g., multi-phase GIP displays and the like). Thus, during step 804, the display driver circuitry 210 updates the active display lines during the blanking period 504 to ensure that the pixels are updated and display artifacts are minimized. At step 806, the equalizer 230 controls the source drivers 212 to drive the source lines for the update duration during the display update period 502. At step 808, the display driver circuitry 210 updates the additional display line(s) during the display update period 502. In this manner, the equalizer 230 controls the source drivers 212 to drive the source lines for substantially the same duration in each of the blanking period 504 and the display update period 502, which equalizes the pixel settling levels between the blanking period 504 and the display update period 502.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. A method of performing capacitive sensing and display updating in an integrated capacitive sensing device and display device, the method comprising:
   driving a plurality of sensor electrodes of the capacitive sensing device for input sensing during a blanking period;
   driving a plurality of source lines using a plurality of source drivers during the blanking period to update a first display line of the display device;
   driving the plurality of source lines using the plurality of source drivers during a display update period to update one or more additional display lines of the display device; and
   adjusting an operational mode of the plurality of source drivers during the blanking period to equalize display pixel settling between the blanking period and the display update period.

2. The method of claim 1, wherein the step of adjusting the operational mode of the plurality of source drivers comprises:
   adjusting a slew rate of the plurality of source drivers during the blanking period.

3. The method of claim 2, wherein the step of adjusting the slew rate of the plurality of source drivers comprises:
   setting the slew rate of the plurality of source drivers to a first slew rate for the first display line during the blanking period; and
   setting the slew rate of the plurality of source drivers to a second slew rate for the one or more additional display lines during the display update period.

4. The method of claim 1, wherein the step of adjusting the operational mode of the plurality of source drivers comprises:
   adjusting a drive time of the plurality of source drivers during the blanking period.

5. The method of claim 4, wherein the step of adjusting the drive time of the plurality of source drivers comprises:
   controlling the plurality of source drivers to drive the plurality of source lines for substantially the same duration in each of the blanking period and the display update period.

6. The method of claim 1, wherein the step of adjusting the operational mode of the plurality of source drivers comprises:
   adjusting a slew rate of the plurality of source drivers during the blanking period; and
   adjusting a drive time of the plurality of source drivers during the blanking period.

7. The method of claim 1, wherein the blanking period comprises a long horizontal blanking period between a pair of display lines of the display device.

8. The method of claim 1, wherein each of the plurality of sensor electrodes comprises one or more common electrodes used for capacitive sensing and display updating, and wherein the step of driving the plurality of sensor electrodes for capacitive sensing comprises driving the common electrodes with modulated signals.

9. A processing system for a capacitive sensing device and a display device, comprising:
 sensing circuitry configured to drive a plurality of sensor electrodes of the capacitive sensing device for input sensing during a blanking period;
 a plurality of source drivers configured to drive a plurality of source lines to update a first display line of the display device during the blanking period and to update one or more additional display lines of the display device during a display update period; and
 a controller, coupled to the plurality of source drivers, configured to adjust an operational mode of the plurality of source drivers during the blanking period to equalize display pixel settling between the blanking period and the display update period.

10. The processing system of claim 9, wherein the controller is configured to adjust the operational mode of the plurality of source drivers by adjusting a slew rate of the plurality of source drivers during the blanking period.

11. The processing system of claim 10, wherein the controller is configured to:
 set the slew rate of the plurality of source drivers to a first slew rate for the first display line during the blanking period; and
 set the slew rate of the plurality of source drivers to a second slew rate for the one or more additional display lines during the display update period.

12. The processing system of claim 9, wherein the controller is configured to adjust the operational mode of the plurality of source drivers by adjusting a drive time of the plurality of source drivers during the blanking period.

13. The processing system of claim 12, wherein controller is configured to:
 control the plurality of source drivers to drive the plurality of source lines for substantially the same duration in each of the blanking period and the display update period.

14. The processing system of claim 9, wherein the controller is configured to adjust the operational mode of the plurality of source drivers by adjusting a slew rate of the plurality of source drivers during the blanking period and adjusting a drive time of the plurality of source drivers during the blanking period.

15. The processing system of claim 9, wherein the controller comprises a control circuit coupled to at least one control terminal of each of the plurality of source drivers.

16. An input device comprising a capacitive sensing device and a display device, the input device comprising:
 a plurality of sensor electrodes;
 a plurality of source lines; and
 a processing system, coupled to the plurality of sensor electrodes and the plurality of source lines, the processing system including:
  sensing circuitry configured to drive the plurality of sensor electrodes for input sensing during a blanking period;
  a plurality of source drivers configured to drive the plurality of source lines to update a first display line of the display device during the blanking period and to update one or more additional display lines of the display device during a display update period; and
  a controller, coupled to the plurality of source drivers, configured to adjust an operational mode of the plurality of source drivers during the blanking period to equalize display pixel settling between the blanking period and the display update period.

17. The input device of claim 16, wherein the controller is configured to adjust the operational mode of the plurality of source drivers by adjusting a slew rate of the plurality of source drivers during the blanking period.

18. The input device of claim 16, wherein the controller is configured to adjust the operational mode of the plurality of source drivers by adjusting a drive time of the plurality of source drivers during the blanking period.

19. The input device of claim 16, wherein the controller is configured to adjust the operational mode of the plurality of source drivers by adjusting a slew rate of the plurality of source drivers during the blanking period and adjusting a drive time of the plurality of source drivers during the blanking period.

20. The input device of claim 16, wherein the controller comprises a control circuit coupled to at least one control terminal of each of the plurality of source drivers.

* * * * *